Oct. 27, 1925.                                                        1,558,459
C. R. BIRDSEY
MACHINE AND METHOD OF MAKING PLASTER WALL BOARD
Filed Oct. 4, 1922            3 Sheets-Sheet 2

INVENTOR.
Charles R. Birdsey
BY Langdon Moore
ATTORNEY.

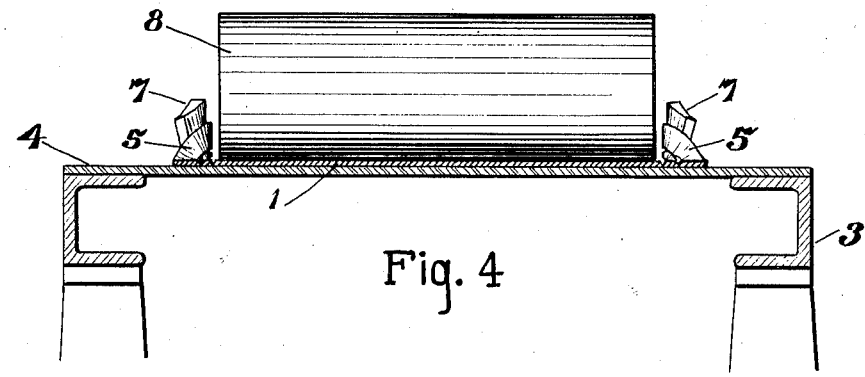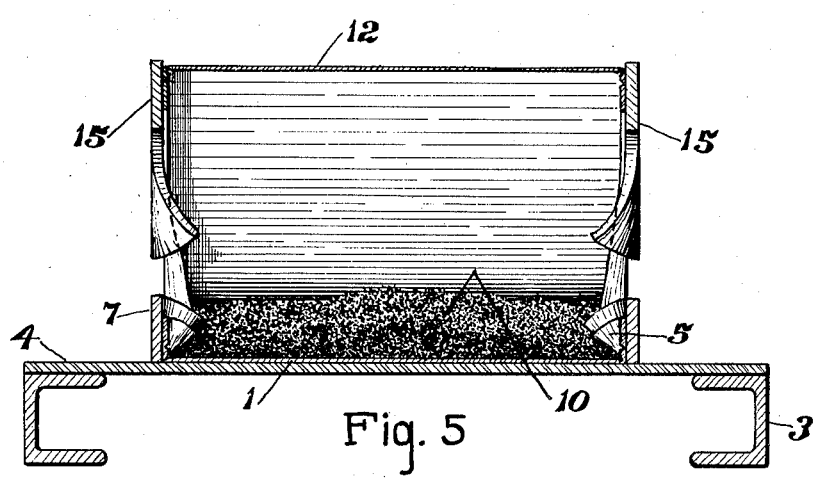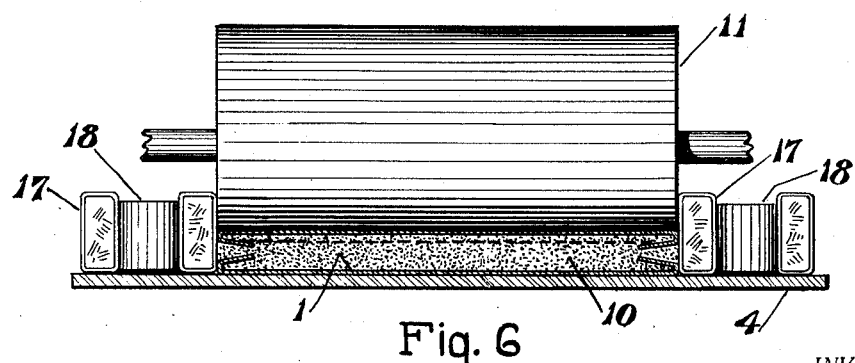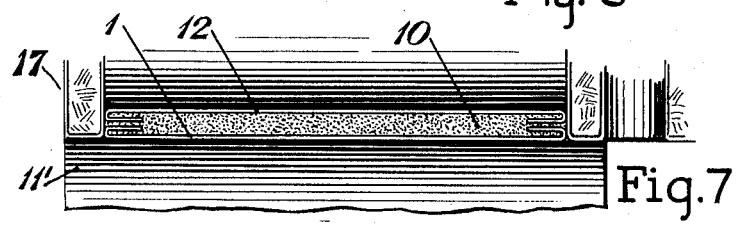

Patented Oct. 27, 1925.

1,558,459

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

MACHINE AND METHOD OF MAKING PLASTER WALL BOARD.

Application filed October 4, 1922. Serial No. 592,294.

*To all whom it may concern:*

Be it known that I, CHARLES R. BIRDSEY, a citizen of the United States, residing at Hinsdale, in the county of Du Page and State of Illinois, have invented new and useful Improvements in Machines and Methods of Making Plaster Wall Board, of which the following is a specification.

This invention relates to improvements in building materials and more particularly to a machine and method for making plaster wallboard.

It is an object of this invention to provide a machine and method for producing the type of plaster wallboard described in my prior Patent No. 1,358,508, November 9, 1920.

While the preferred forms of this invention are illustrated upon the accompanying sheets of drawing, yet minor detail changes may be made without departing from the scope thereof.

Figure 1:
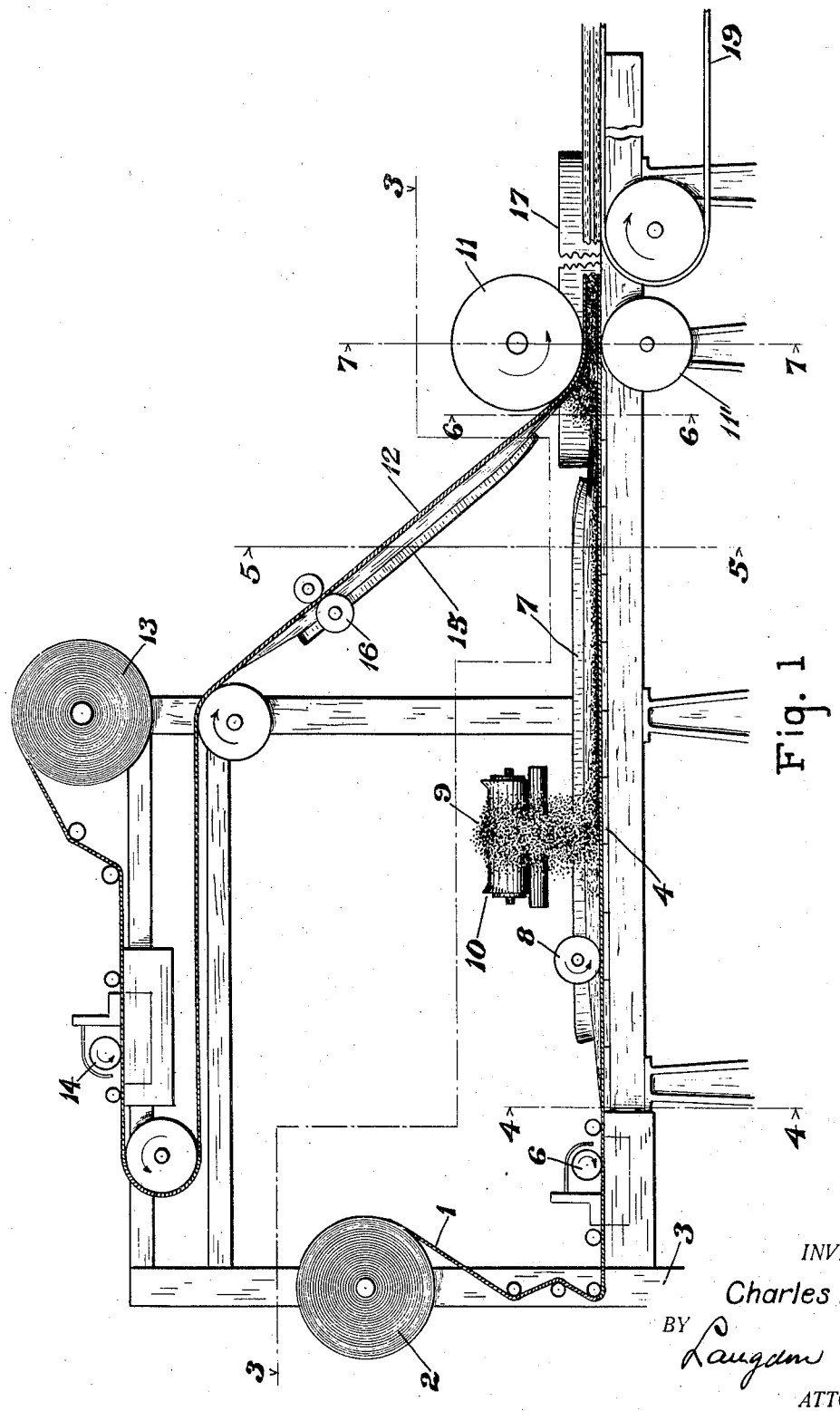

In drawings;

Figure 1—is a view in side elevation and partly in vertical section of the board forming end of a machine constructed in accordance with this invention for manufacturing the plaster wallboard as disclosed in my Patent No. 1,358,508 of November 9, 1920.

Figure 2:
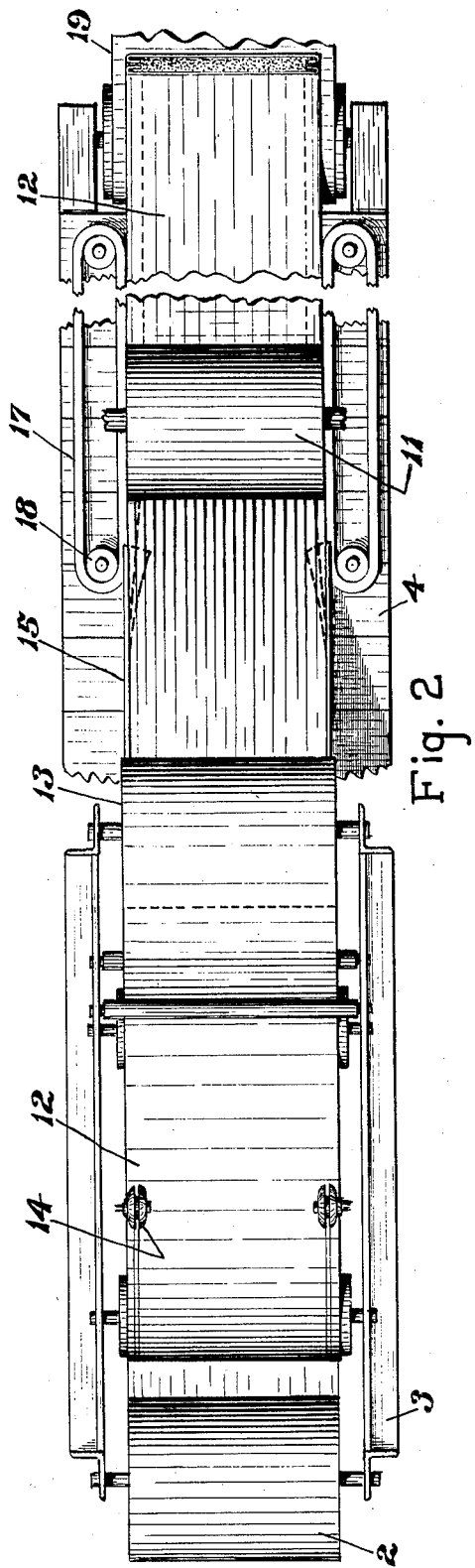

Figure 2—is a top plan view of Figure 1.

Figure 3:
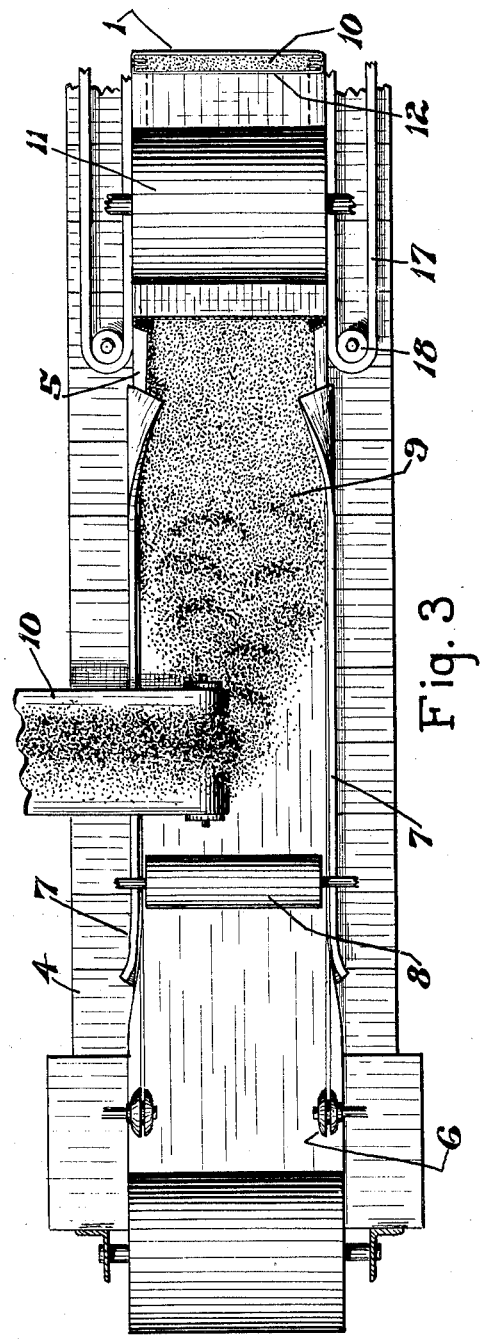

Figure 3—is a top plan view of Figure 1 with the parts above the line 3—3 removed.

Figures 4, 5, 6 and 7—are sectional views taken on line 4—4, 5—5, 6—6 and 7—7, Figure 1.

It is customary to manufacture plaster board or plaster wall board continuously by advancing the bottom sheet of fibrous material over a table and apply the plaster body in a plastic state by depositing it from a conveyor upon this bottom sheet and then applying a top cover sheet and passing the two cover sheets with the plastic material between them through a forming device including one or more pressure rollers, which impart the thickness and width to the board, and after passing through this device, the board so formed is advanced on a movable conveyor to a distance great enough to allow the formed board to set sufficiently so that it may be cut, removed from conveyor and conveyed to the drying kiln. In carrying out this invention the machine is of the general type above described and as this invention only relates to forming or shaping of the board proper, it is only necessary to illustrate and describe the board forming end of such machine.

Figure 1 of the drawing illustrates a machine for forming the plaster wall board, more particularly illustrated in cross section in Figure 7, from which it is seen that the marginal portions of each cover sheet are bent inwardly of the board providing four thickness of paper at the edge where the securing nail is driven, with a layer of the plastic material forming the plaster body interposed between each of the said layers of paper.

It is, therefore, necessary to provide a machine which will turn the margins of each cover sheet inwardly as shown in said sectional view, which this improved machine accomplishes by advancing the bottom sheet 1 from a roll 2 of paper supported upon the frame 3 onto the flat table 4. To insure the accurate bending of the cover sheet at the proper points in turning in the margins 5, it is preferable to provide scoring devices 6 between the paper roll and the table, which will reduce the thickness of the sheet in two parallel equi-distant lines adjacent to each edge. To cause the proper bending of the margins, pick-up and folding members 7 are arranged on each side of table with the end adjacent to the scoring devices engaging under the margins of the sheet, which as the sheet progresses therebetween will turn the margins 5 upright along the inner scored lines and then bend the upper portion of the margins downward along the outer scored lines. It is also preferable to provide a holding roll 8, extending between the inner scored lines where the pick-ups turn the sheet margins vertically, which roll insures the main body of the sheet being held in contact with the flat table, so that the margins will make a right angular bend with the main body.

The plaster material 9 is delivered in a plastic state, preferably on a belt conveyor 10 and deposited centrally of the bottom sheet as it advances between the pick-ups.

A cylindrical pressure, squeeze or forming roll 11 is mounted over the table for applying the top cover sheet 12 which is advanced from a roll of paper 13 mounted upon the frame above the table, in the manner shown. It is also preferable to score this sheet in the same manner as the bottom sheet by the scoring device 14 illustrated. To impart the bends to the margins of this sheet along the scored lines, side pick-ups and folders 15 and holding roll 16, similar to those described in connection with the bottom sheet are provided and supported upon the frame so that when the top cover sheet is advanced onto the forming roll, its margins will be bent in the manner shown in Figure 6.

As the cover sheets pass under the forming roll and over the top of the table at this point, and as the plastic mass upon the bottom sheet usually dams up in front of the forming roll, the pressure caused by applying the top cover sheet would cause the plastic mass to ooze out between the edges at each side. To prevent this taking place and to insure a board with a square edge, guiding means are provided on each side of the pressure roll in the form of endless belts 17 rotating over vertical pulleys 18 extending from adjacent the ends of the side pick-ups and folders 7 on the table to a point considerably beyond the forming roll, preferably at the end of the table where the formed board is delivered upon the endless carrier 19. These belts engage the folded edge of both cover sheets adjacent thereto and travel along with the board and at the same rate of speed, so that the plastic body between the bend in the edges will be held thereby until the plastic mass sets sufficiently to maintain the shape so imparted.

Figures 4, 5 and 6 illustrate the actions of the top and bottom sheet pick-ups and folders and the operation of the side belts during the formation of the board. The scoring of the sheets insure the formation of aligned square edges and the turning in of the margins as sheets approach the forming roll insures the plastic mass, as the sheets and mass pass under the forming roll, to enter and fill the space between the turned in margins and their main bodies. The distance between the bottom of the forming roll and the top of the table determines the thickness of the board and the distance between the vertical scored lines adjacent each edge of each sheet determines the thickness or the amount of each cover sheet interposed at the edge as well as the amount of the plastic body therebetween.

What I claim is:

1. A machine for making plaster wallboard comprising means for advancing a plastic mass between fibrous cover sheets, means for folding in the margins of said sheets to enter into the plastic mass, board forming means, means for passing the cover sheets and plastic mass with the folded in margins of the cover sheets embedded in the mass through the board forming means, said means including the application of pressure upon the cover sheets for causing the plastic mass to enter between the cover sheets and their respective folded margins and bond the cover sheets and margins to each other through the medium of the plastic body of the formed board.

2. A machine for making plaster wallboard comprising means for advancing a plastic mass between fibrous cover sheets, means for folding the margins of said sheets to overlie the edges of the board with the extremities thereof entering into the plastic mass, a board forming means, means for passing the cover sheets with a substantial portion of the margins embedded in the plastic mass through said forming means, means included in the forming means to force a portion of the plastic mass between the margins and between the respective margins and the main body of their cover sheets to bond the margins to each other and to their respective cover sheets whereby a board with a four ply edge is formed.

3. A method of making plaster board comprising the advancing of a plastic mass between fibrous cover sheets, the folding of the margins of the cover sheets to overlie the edges of the board, causing a substantial portion of the extremities of the margins to become embedded in the plastic mass and passing the cover sheets with their margins so embedded through a board forming device and forcing sufficient of the plastic mass between the margins and between the margins and their respective sheets to bond the margins to each other and to their respective cover sheets.

CHARLES R. BIRDSEY.